Feb. 18, 1964 J. E. LOVELL 3,121,863

HIGH SPEED DATA TAPE HANDLING MECHANISM

Filed May 31, 1960 2 Sheets-Sheet 1

INVENTOR
JOHN E. LOVELL

BY Walter Katz
ATTORNEY

United States Patent Office 3,121,863
Patented Feb. 18, 1964

3,121,863 HIGH SPEED DATA TAPE HANDLING MECHANISM

John E. Lovell, Greenwich, Conn., assignor to International Business Machines Corporation, New York, N.Y., a corporation of New York Filed May 31, 1960, Ser. No. 32,880
4 Claims. (Cl. 340—174.1)

This invention relates to a high speed type handling mechanism and more particularly the invention herein relates to a data tape drive system capable of operation in concert with electronic computing machines.

Present-day tape transport systems used in electronic computers are illustrated by U.S. Patent 2,792,217, issued May 14, 1957, to James A. Weidenhammer and Walter S. Buslik, and assigned to the same assignee as this invention. What is described herein is a more compact data tape drive mechanism.

It is the primary object of this invention to provide an improved data tape handling mechanism.

A further important object of the instant invention is to provide a high speed tape drive mechanism which is compact in design.

Still a further object of this invention is to provide a compact, high speed tape drive mechanism in which the tape is passed over the recording head with maximum alignment of tape and head internally built into the system.

Among the specific objects of the instant invention is to provide a data tape handling apparatus wherein there is present inner and outer reels having a common tape wound thereon and a bight segment length of tape therebetween and wherein one of the reels is rotated at a controlled speed in relation to the other in accordance with the relative amount of tape on it and the speed of a data transducer arm which is operatively positioned in the annular space between the reels and abutting the tape segment length.

The foregoing and other objects, features and advantages of the invention will be apparent from the following more particular description of preferred embodiments of the invention, as illustrated in the accompanying drawings.

Figure 1:
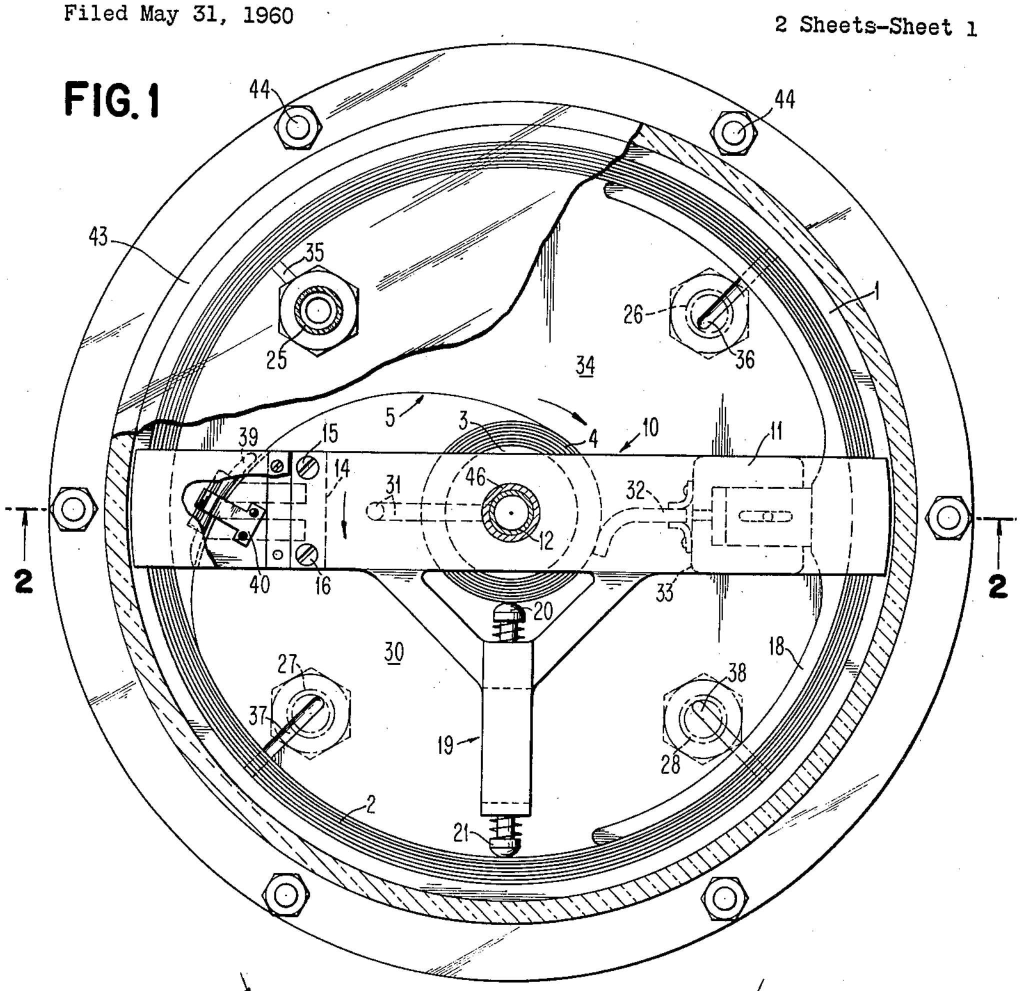
FIGURE 1 is a plan view partly in section showing the tape drive mechanism of the present invention.
Figure 2:
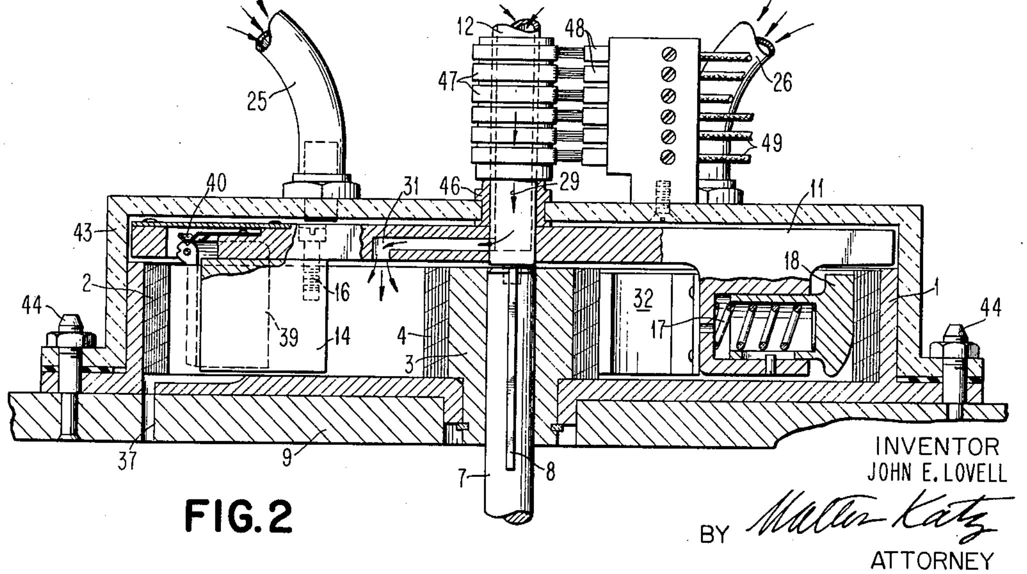
FIGURE 2 is an elevational view in section of the tape drive mechanism taken along lines 2—2 of FIGURE 1 showing the completely assembled mechanism.

The data tape transport system of the present invention includes an outer reel having tape wound on the inside thereof and an inner reel with a tape wound on the outside thereof. A bight segment length of tape is located between said reels. A rotatable data transducer arm is operatively positioned in the annular space between the inner and outer reels to scan the segment length of tape between the inner and outer reels. A read-write head and associated tape guides are mounted on the transducer arm, the guide serving to maintain the tape against the inner portion of the outer reel and to prevent slack from forming in the outer tape reel. Drive means are provided for maintaining a constant relative speed between the read-write head and the tape in the segment being scanned thereby.

An understanding of the invention may be obtained by particular reference to the figures in which there is shown a preferred embodiment of the data tape handling mechanism of the instant invention. The apparatus includes an outer stationary reel 1 having a portion of common data tape 2 such as magnetic tape, film and the like, mounted on the inside thereof and a concentric rotatable inner tape reel 3 with its associated tape 4 on the outside thereof. Between said reels is connecting bight tape segment 5. The tape may be unreeled from the inner reel and wound on the inside of the outer reel and vice versa. The inner reel is separately and independently driven by a drive motor 6 (FIGURE 5) through the inner reel drive spindle 7 keyed to the inner reel by a key 8. The outer reel is fixedly mounted on a base 9 for additional support.

Figures 3, 4, 5:
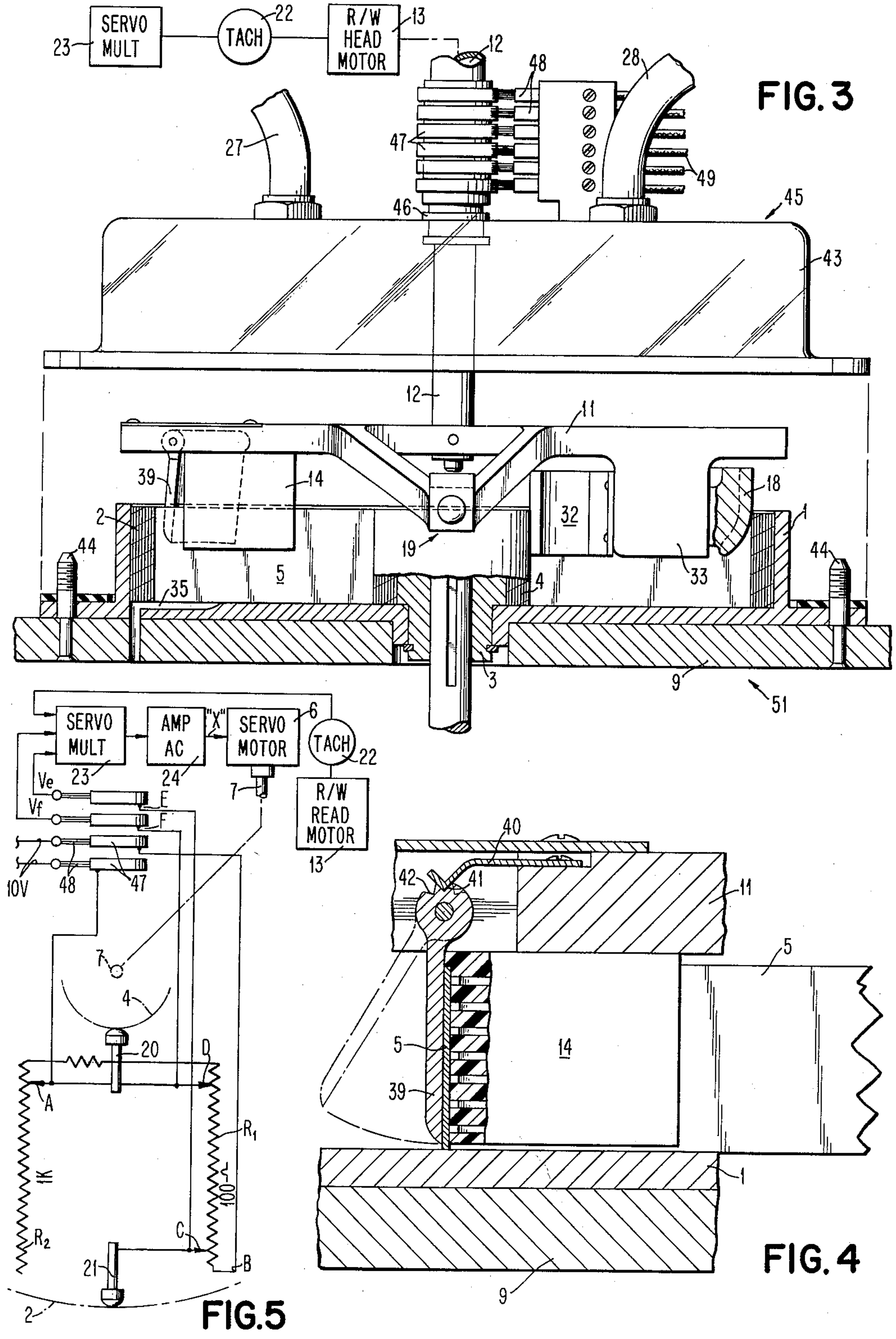
FIGURE 3 is a view similar to that shown in FIGURE 2 showing the device partially disassembled.
FIGURE 4 is an elevational view in section of the latching mechanism used in the tape transport mechanism.
FIGURE 5 is a schematic view of the servo mechanism for driving the inner reel in accordance with the amount of tape thereon.

A data transducer arm assembly 10 is provided to write information onto the tape and to read information from the tape. The assembly include a generally T-shaped, hollow transducer arm 11 mounted for rotation on a hollow read-write drive spindle 12 which is driven at a constant angular velocity, $\omega_{r/w}$, by a synchronous motor 13 (FIGURE 5). At one end of the arm is a read-write head 14 which is rigidly secured to the arm by means of mounting screws 15 and 16. On the other end of the read-write arm is a spring 17 which biases a counterbalancing read-write tape pressure pad 18 which serves both to maintain the tape against the outer reel and to align the head in position against the tape. The read-write head scans the segment length of tape 5 between the inner and outer reels.

The angular velocity of the inner reel is controlled in accordance with the angular velocity of the read-write head and the relative radii of the inner and outer reels during operation by the mathematical relationship (Equation 1)

$$\omega_i = \omega_{r/w} \frac{(r_o - r_i)}{r_i}$$

where $\omega_i$=angular velocity of the inner reel
$\omega_{r/w}$=angular velocity of the transducer arm
$r_i$=variable outer radius of the inner reel with tape on it
$r_o$=variable inner radius of the outer reel with tape on it The ratio $$\frac{r_o - r_i}{r_i}$$

is obtained through the potentiometer apparatus 19 which is mounted on the transducer arm and positioned between the inner and outer reels (FIGURE 1). As the tape unwinds from the inner to the outer reel or vice versa, a pair of biased plungers 20 and 21 slidably mounted in the potentiometer assembly and biased respectively radially inward and outward bear on the inner and outer reel tape. The plungers divide themselves proportionally to reduce or increase the inner reel drive velocity in accordance with Equation 1.

Referring now to the electrical circuit of the potentiometer apparatus shown in FIGURE 5, it is seen that a constant reference voltage, e.g., 10 volts, is applied between the movable grounded point A and the fixed point B. As the amount of tape on the outer reel is varied, movable point C moves along rheostat $R_1$, while at the same time varying the amount of tape on the inner reel causes points A and D to move along rheostats $R_1$ and $R_2$ respectively, from opposite ends of $R_1$. The electrical output at points E and F, namely $V_e$ and $V_f$, according to the voltage division in the circuit, is proportional to the radius ratio $$\frac{r_o-r_i}{r_i}$$

Both the radius ratio voltage and the transducer speed as received from its associated read-write head motor tachometer 22 output are then multiplied in a servo multiplier 23, amplifier 24, and the product X fed back into the inner reel servo motor 7 to continuously control the proper inner reel speed in accordance with Equation 1.

Various additional features of the apparatus of the present invention have been provided for more efficient operation thereof and may be seen by further reference to the figures. A first external source of air pressure is maintained between the inner and outer reels and in turn between the outer reel and atmosphere by means of four internal air ducts 25, 26, 27, and 28 positioned between the annular area of the inner and outer reels. This air pressure maintains the tape in two extreme positions, that is, the outer tape against the inner portion of the outer reel and the inner tape against the outer portion of the inner reel. A second external air supply 29 is ducted into the read-write arm through the read-write arm drive spindle and into the first half of the housing chamber 30 through apertures 31. This air supply is under greater pressure than the first air supply and maintains the spiral segment of the tape 5 taut during reeling and thus prevents it from becoming looped back upon itself and possibly kinked. A felt wiper 32 attached to the read-write pressure pad at 33 separates the mechanism into two differential pressure chambers, the first designated as 30 and the second as 34, and effectively prevents escape of air pressure from one chamber into another. Four bleed orifices 35, 36, 37, and 38 are employed under the outer portion of the reel tape to maintain the air pressure differential between the layers of tape and the atmosphere.

The details of the construction of the read-write head and the threading of the tape thereon will now be described with particular reference to FIGURE 4. Prior to the read-write operation, the read-write head is brought into abutment with tape 5 by pivoting a spring loaded pressure pad 39, which clamps upon the tape and holds it in the proximity of the read-write head. The pivoting apparatus is detended into the down position by a spring member 40 latching on a first V-notch 41 on the pressure pad. A second V-notch 42 detents the pressure pad in the release position.

As shown particularly in FIGURE 3 the mechanism of the present invention consists of two separate sections which are assembled to form a compact unit. The first section is a cover section 45 which includes the transducer arm 11 fixedly mounted to its hollow drive shaft 12 which is in turn mounted on the cover 43 by bushing 46, and air ducts 26, 27, 28, and 29. Also included in the cover section are conventional commutator slip rings 47, brushes 48 and electrical connections 49 mounted on the transducer arm drive shaft. The slip rings are internally connected to the transducer arm and to the potentiometer 19. The second section is a base section which has mounted thereon the reels and associated drive mechanism.

In usual tape loading operation the tape is wound around the inside of the outer reel, looped between the read-write head and the pressure pad, the sections brought together and the pad locked in position and the tape fixed to the inner reel. The servo motor for the inner reel feeds the tape clockwise from the outer reel to the inner reel at a predetermined rate. At the same time the transducer arm is rotated counter-clockwise by means of its associated driving mechanism which are mounted on cover 43 and which may be locked into position on the base by mounting studs 46. Thereafter the two sections are assembled after threading the tape by bringing the inner reel and the transducer arm drive spindles together in alignment.

In operation the transducer or read-write arm may be driven in either direction for winding or unwinding the tape off the inside of the inner reel. Conversely for a given rotation of the read-write head, the inner reel may be rotated at a reduced angular velocity in a direction opposite to that of the read-write head.

An alternate method of operation of the high speed tape drive mechanism described herein is as follows: the transducer arm is maintained in a stationary position and both the outer reel and inner reel are rotated in the same direction. Thereby the element of tape which passes between the inside of the outer reel and the outside of the inner reel is kept in a constant position so that it may be read or written on by the stationary read-write head. In this embodiment the inner reel is rotated at an increased angular velocity as compared to the outer reel in order to maintain the bight of tape connecting the inner and outer reels in a stationary position.

As another example of the scope of the present invention it will be obvious to those skilled in the art that the stationary head may function in high speed winding operations as an idler positioning guide for the element of tape which is being wound off the inside of the outer reel and onto the outer side of the inner reel. When the desired position on the tape is reached, the reels are slowed down to the read-write speed and the information extracted from or recorded on the tape.

It will be obvious to those skilled in the art that with three rotatable parts requiring predetermined movement relative to each other, tape transport may be obtained according to the present invention either by rotating the read-write head, or keeping the head stationary, by rotating the inner and outer reels in combination with a rotating read-write head, or alternatively rotating the inner and outer reels and the head. Furthermore various acceleration rates or power requirements for the inner or outer reel and/or the read-write head may be achieved by using one of the other of these techniques.

A particular advantage of the high speed tape drive mechanism of the present invention resides in the fact that rotation of the outer and inner reels and the read-write head may take place in a common plane with only a relatively short segment length of tape exposed between the reels. This structure enhances the self-alignment characteristics of the tape under the read-write head.

While it is shown that the inner reel as center of rotation of the read-write head as well as the center of the outer stationary reel or in some cases rotating outer reel are all concentric; however, these aforementioned generalized characteristics need not be employed where other or possible gained advantages may be realized by using non-concentric reels or non-concentric read-write rotational axis or where it may be more feasible to arrange the axis of the planes of the inner and outer reels out of their common planes. For example, the inner and outer reel axis of the plane of the inner and outer reels may be out of line to enable a spiral helical winding of an element of tape between the inner and outer reels to be applied in an alternate random access drum.

In order to aid those skilled in the art to use the apparatus of the present invention the following details of construction will be presented. The mechanical advantage, M.A., of the tape transport motion varies with the relative radii of the inner and outer reels according to the formula: $M.A.=r_i/r_o+r_i/(r_o-r_i)$ where M.A. is the mechanical advantage of the inner reel tape motion as compared to the outer reel motion. For a mechanical advantage of about 10, the outer reel itself should be about 19 inches, the inner reel itself 15 inches, the outer reel with tape, defined as $r_o$, an average 18 inches and the inner reel with tape, defined as $r_i$, an average of about 16 inches. Accordingly, the inner reel is rotated at a speed of 100–300 r.p.m. and the transducer arm at 1000–3000 r.p.m. The merit of performance, that is the speed at which information in the form of data bits may be supplied the present apparatus according to the equation:

Bit rate $=(\omega_{r/w})$ times (transducer arm radius) (bit density) (number of tracks on tape)

It will be further apparent to those skilled in the art that the low power level required to stop and start the transducer arm is particularly advantageous in high speed computer operation where it is necessary to undergo many successive starts and stops in a short time interval.

While the invention has been particularly shown and described with reference to preferred embodiments thereof, it will be understood by those skilled in the art that various changes in form and details may be made therein without departing from the spirit and scope of the invention.

What is claimed is:

1. A data tape handling mechanism comprising inner and outer reels defining an annular space therebetween, a common tape wound on the outside of the inner reel and on the inside of the outer reel wherein the tape passes directly from the inner portion of the outer reel to the outer portion of the inner reel forming a bight segment of tape in said annular space, a transducer arm having a read-write head operatively positioned in and adapted to rotate substantially in the plane of said annular space and around the axis of said inner reel to scan the tape along its longitudinal axis to scan said bight segment of tape, and means to rotate said inner reel at a controlled variable speed, $\omega_i$, in accordance with the formula:

$$\omega_i=(\omega_{r/w})\frac{(r_o-r_i)}{r_i}$$

where:

$\omega_i$=angular velocity of the inner reel
$\omega_{r/w}$=angular velocity of the transducer arm
$r_o$=radius of the outer reel with tape on it
$r_i$=radius of the inner reel with tape on it to maintain a predetermined relative speed between said tape and said read-write head during transport of tape from one of said reels to the other said rotation means including drive means and control means therefor comprising at least one potentiometer whose movable contact is actuated by a follower maintained in contact with the tape surface on at least one of said reels, and wherein the output of said potentiometer is utilized to maintain said predetermined relative speed between said tape and said read-write head.

2. A tape handling apparatus for controllably reeling a data record tape past a data transducer comprising an outer reel and an inner reel disposed in substantially co-planar relationship and defining an annular space therebetween, a tape wound on the inner surface of said outer reel and the outer surface of said inner reel and having a bight segment of tape connecting the respective windings wherein the tape passes directly from the inner portion of the outer reel to the outer portion of the inner reel, a data transducer operatively positioned in surface to surface contact with said bight of tape, means to rotate said transducer in the annular space in co-planar relationship therewith to scan the tape in a direction along its longitudinal axis and means to rotate at least one of said reels to maintain said transducer in continuous contact with the bight segment of tape and maintain a constant relative motion therebetween.

3. A data tape handling mechanism as set forth in claim 2 wherein the transducer means comprises an arm carrying a read-write head at one end thereof operably positioned near said segment of tape for scanning said segment of tape for data writing and retrieving, and a counterbalancing spring biased pressure pad carried by said arm at its other end for maintaining said tape wound tightly against said outer reel and said segment length of tape in operative alignment with said read-write head.

4. A data tape handling mechanism as set forth in claim 2 including means for isolating said annular space into two chambers and means for establishing a differential air pressure in one of said chambers to maintain said tape firmly against said reels.

References Cited in the fil of this patent

UNITED STATES PATENTS

| | | |
|---|---|---|
| 2,177,505 | Van der Schalie | Oct. 24, 1939 |
| 2,280,067 | Eggert et al. | Apr. 21, 1942 |
| 2,856,463 | Lyon | Oct. 14, 1958 |
| 2,912,518 | Maxey | Nov. 10, 1959 |